United States Patent
Kim et al.

(10) Patent No.: US 11,302,901 B2
(45) Date of Patent: Apr. 12, 2022

(54) ELECTRODE ASSEMBLY AND METHOD OF STABILIZING SECONDARY BATTERY

(71) Applicant: LG Chem, Ltd., Seoul (KR)

(72) Inventors: Jeonggil Kim, Daejeon (KR); Jungseok Choi, Daejeon (KR); Song Taek Oh, Daejeon (KR)

(73) Assignee: LG Energy Solution, Ltd.

(*) Notice: Subject to any disclaimer, the term of this patent is extended or adjusted under 35 U.S.C. 154(b) by 279 days.

(21) Appl. No.: 16/609,859

(22) PCT Filed: Oct. 25, 2018

(86) PCT No.: PCT/KR2018/012742
§ 371 (c)(1),
(2) Date: Oct. 31, 2019

(87) PCT Pub. No.: WO2019/088570
PCT Pub. Date: May 9, 2019

(65) Prior Publication Data
US 2020/0083519 A1    Mar. 12, 2020

(30) Foreign Application Priority Data
Nov. 1, 2017 (KR) .................. 10-2017-0144769

(51) Int. Cl.
*H01M 4/04* (2006.01)
*H01M 10/42* (2006.01)
(Continued)

(52) U.S. Cl.
CPC ..... *H01M 4/0404* (2013.01); *H01M 10/4235* (2013.01); *H01M 50/411* (2021.01);
(Continued)

(58) Field of Classification Search
None
See application file for complete search history.

(56) References Cited

U.S. PATENT DOCUMENTS

| 8,574,752 B2 | 11/2013 | Kim et al. |
| 9,178,201 B2 | 11/2015 | Lee et al. |

(Continued)

FOREIGN PATENT DOCUMENTS

| JP | 2004-327183 A | 11/2004 |
| JP | 2007-053055 A | 3/2007 |

(Continued)

OTHER PUBLICATIONS

JP2007052055 English translation. Arakawa. Japan. Mar. 1, 2007. (Year: 2007).*

(Continued)

*Primary Examiner* — Christopher P Domone
(74) *Attorney, Agent, or Firm* — Lerner, David, Littenberg, Krumholz & Mentlik, LLP (57) ABSTRACT

An electrode assembly according to an exemplary embodiment of the present invention includes a cathode plate and an anode plate; a separator disposed between the cathode plate and the anode plate; and coating layers disposed between the separator and the cathode plate and between the separator and the anode plate. The separator includes a first portion that is covered with the coating layer, and a second portion that exposes a surface facing the cathode plate and a surface facing the anode plate, and at least one of the cathode plate and the anode plate includes a positive temperature coefficient (PTC) material.

9 Claims, 5 Drawing Sheets

(51) Int. Cl.
  *H01M 50/44* (2021.01)
  *H01M 50/46* (2021.01)
  *H01M 50/411* (2021.01)
  *H01M 50/572* (2021.01)

(52) U.S. Cl.
  CPC .......... *H01M 50/44* (2021.01); *H01M 50/46* (2021.01); *H01M 50/572* (2021.01); *H01M 2200/106* (2013.01)

(56) References Cited

U.S. PATENT DOCUMENTS

| | | | |
|---|---|---|---|
| 2014/0220401 A1* | 8/2014 | Lee | H01M 10/052 429/94 |
| 2015/0056491 A1* | 2/2015 | Zhao | H01M 50/449 429/144 |
| 2016/0240836 A1* | 8/2016 | Aotani | H01M 50/581 |
| 2017/0309970 A1 | 10/2017 | Kim et al. | |

FOREIGN PATENT DOCUMENTS

| | | |
|---|---|---|
| KR | 10-2006-0042845 A | 5/2006 |
| KR | 10-2008-0111335 A | 12/2008 |
| KR | 10-1181804 B1 | 9/2012 |
| KR | 10-1453037 B1 | 10/2014 |
| KR | 10-1557302 B1 | 10/2015 |
| KR | 10-2016-0067451 A | 6/2016 |
| KR | 10-2016-0073298 A | 6/2016 |
| WO | 03065481 A1 | 8/2003 |

OTHER PUBLICATIONS

Chung et al, "Enhancement of Meltdown Temperature of the Polyethylene Lithium-Ion Battery Separator Via Surface Coating with Polymers Having High Thermal Resistance," Industrial & Engineering Chemistry Research, May 6, 2009, pp. 4346-4351, vol. 48, No. 9, XP055694087.

Extended European Search Report with Written Opinion for Application No. 18873096.4 dated May 25, 2020, 10 pages.

Kise et al, "Effect of the Addition of Conductive Material to Positive Temperature Coefficient Cathodes of Lithium-Ion Batteries," Journal of The Electrochemical Society, Jan. 1, 2005, pp. A1516-A1520, XP055694443.

Lee et al, "Synergistic thermal stabilization of ceramic/co-polyimide coated polypropylene separators for lithium-ion batteries," Journal of Power Sources, Oct. 1, 2015, pp. 537-544, vol. 294, XP055694568.

Zhu et al, "A Highly Thermostable Ceramic-Grafted Microporous Polyethylene Separator for Safer Lithium-Ion Batteries," ACS Applied Materials & Interfaces Nov. 4, 2015, pp. 24119-24126, vol. 7, No. 43, XP055694572.

PCT Search Report and Written Opinion for International Patent Application No. PCT/KR2018/012742, dated Feb. 1, 2019, 9 pages.

* cited by examiner

FIG. 1

SECOND DIRECTION
↑
└─► FIRST DIRECTION

ELECTRODE ASSEMBLY AND METHOD OF STABILIZING SECONDARY BATTERY

CROSS-REFERENCES TO RELATED APPLICATIONS

This application is a U.S. national phase application, pursuant to 35 U.S.C. § 371, of PCT/KR2018/012742, filed Oct. 25, 2018, designating the United States, which claims priority to Korean Application No. 10-2017-0144769, filed Nov. 1, 2017. The entire contents of the aforementioned patent applications are incorporated herein by this reference.

TECHNICAL FIELD

The present invention relates to an electrode assembly and a method of stabilizing a secondary battery, and more specifically, to an electrode assembly having an improved battery cell stability and a method of stabilizing a secondary battery using the same.

BACKGROUND ART

In accordance with the technology development for mobile devices and an increase in demand for the mobile devices, a demand for secondary batteries as an energy source has rapidly increased. Therefore, many studies on the secondary batteries that may satisfy various needs have been conducted.

An interest in the secondary batteries as an energy source for power devices such as an electric bicycle, an electric vehicle, a hybrid electric vehicle or the like, as well as mobile devices such as a cellular phone, a digital camera, a laptop computer or the like has increased.

Small-sized devices such as a cellular phone, a camera or the like use a small battery pack in which one battery cell is packed. However, medium to large-sized devices such as a laptop computer, an electric vehicle or the like use a medium to large-sized battery pack in which two or more battery cells are packed in parallel and/or or in series.

Lithium secondary batteries have excellent electrical characteristics, but have low stability. For example, the lithium secondary batteries may generate heat and gas caused by decomposition reaction of an active material, an electrolyte or the like, which are battery components, in an abnormal operation state such as overcharging, overdischarging, exposure to a high temperature, an electrical short-circuit or the like. High temperature and high pressure conditions resulting from this may further promote the decomposition reaction, thereby causing ignition or explosion

DISCLOSURE

Technical Problem

The present invention has been made in effort to provide an electrode assembly capable of terminating overcharging in a stable state, upon abnormal heating due to overcharging or the like, and a method of stabilizing a secondary battery.

However, problems to be solved by embodiments of the present invention are not limited to the above-mentioned problems, and may be variously extended within a scope of technical ideas included in the present invention.

Technical Solution

An exemplary embodiment of the present invention provides an electrode assembly including a cathode plate and an anode plate; a separator disposed between the cathode plate and the anode plate; and coating layers disposed between the separator and the cathode plate and between the separator and the anode plate. The separator includes a first portion that is covered with the coating layer, and a second portion that exposes a surface facing the cathode plate and a surface facing the anode plate, and at least one of the cathode plate and the anode plate includes a positive temperature coefficient (PTC) material.

The cathode plate may include a cathode current collector and a cathode active material layer, and the anode plate may include an anode current collector and an anode active material layer. The second portion of the separator may be overlapped with the cathode active material layer and the anode active material layer in a direction perpendicular to an upper surface of the separator.

A portion of the cathode current collector and a portion of the anode current collector which overlap an entire region occupied by the second portion of the separator in the direction perpendicular to the upper surface of the separator may be covered with the cathode active material layer and the anode active material layer, respectively.

The second portion of the separator may be disposed at an edge of the separator.

The coating layer may be an organic-inorganic composite layer.

The separator may include a polyolefin-based material.

Another embodiment of the present invention provides a method of stabilizing a secondary battery, including allowing a voltage and a temperature of the secondary battery to increase due to overcharging of an electrode assembly, wherein the electrode assembly includes a cathode plate, an anode plate, a separator electrically insulating the cathode plate and the anode plate from each other, and coating layers disposed between the separator and the cathode plate and between the separator and the anode plate. The method further includes allowing the cathode plate and the anode plate to be short-circuited with each other due to a thermal shrinking of a second portion of the separator, the separator including a first portion that is covered with the coating layer and the second portion that exposes a surface facing the cathode plate and a surface facing the anode plate; allowing the voltage of the secondary battery to decrease due to the short-circuit between the cathode plate and the anode plate; allowing the temperature to increase by maintaining a state of charge after the decrease of the voltage of the secondary battery due to the short-circuit; and allowing a resistance to increase by a positive temperature coefficient (PTC) material included in at least one of the cathode plate and the anode plate.

The increase of the resistance by the PTC material may occur in the increase of the temperature by maintaining the state of charge.

The cathode plate may include a cathode current collector and a cathode active material layer, and the anode plate may include an anode current collector and an anode active material layer. Further, the short-circuiting of the cathode plate and the anode plate with each other may include bringing the cathode active material layer and the anode active material layer into contact with each other.

In the allowing the resistance to increase, the voltage of the secondary battery may reach a maximum value.

Advantageous Effects

According to exemplary embodiments, the uncoated portion of the separator is shrunk in an overcharging condition, to cause the cathode and the anode to be short-circuited with each other and to generate discharging. As a result, the secondary battery becomes a stable state of charge. In this case, the positive temperature coefficient (PTC) characteristics may be sufficiently expressed in the state of charge in which thermal runaway due to self-heating does not occur, whereby overcharging may be safely terminated.

MODE FOR INVENTION

Hereinafter, embodiments of the present invention will be described in detail with reference to the accompanying drawings so that those skilled in the art may easily practice the present invention. The present invention may be implemented in various different forms and is not limited to exemplary embodiments described herein.

Portions unrelated to the description will be omitted to more clearly describe the present invention, and similar components will be denoted by same reference numerals throughout the specification.

In addition, since sizes and thicknesses of the respective components illustrated in the drawings are arbitrarily illustrated for convenience of explanation, the present invention is not necessarily limited to those illustrated in the drawings. In the following drawings, thicknesses are exaggerated in order to clearly represent several layers and areas. In addition, in the accompanying drawings, thicknesses of some of layers and regions are exaggerated for convenience of explanation.

It will be understood that when an element such as a layer, a membrane, a region, a plate or the like, is referred to as being "on" or "over" another element, it may include not only the case where it is "directly on" another element but also the case where there is another element present therebetween. To the contrary, it will be understood that when any element is referred to as being "directly on" another element, an element may be not present therebeween. In addition, "on" or "over" does not necessarily mean that any element toward the opposite direction of gravity, but means that any element positioned on or below the reference portion.

Throughout the specification, unless explicitly described to the contrary, "comprising" any components will be understood to imply the inclusion of other elements rather than the exclusion of any other elements.

Further, throughout the specification, the expression "on the plane" means the case in which a target is viewed from the top, and the expression "on the cross section" means the case in which a cross section of a target taken along a vertical direction is viewed from the side.

Figure 1:
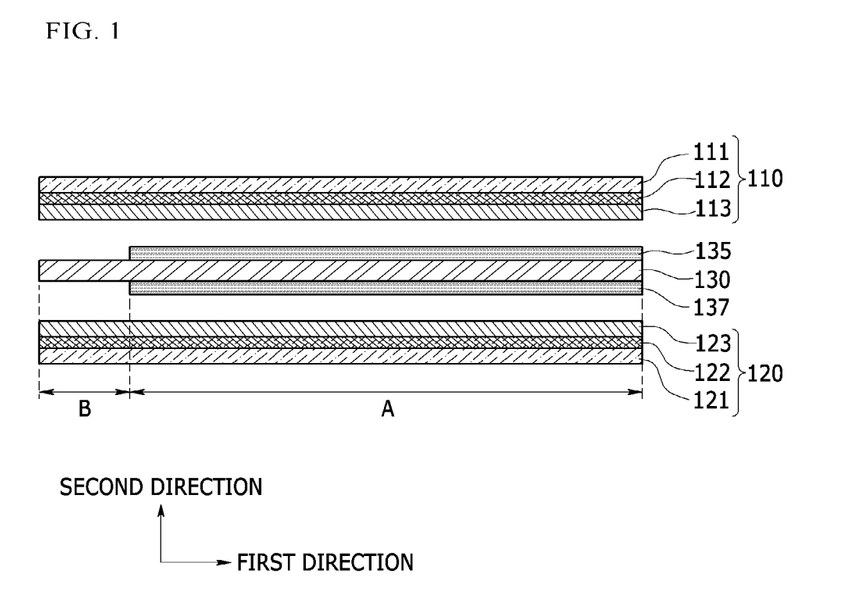
FIG. 1 is a schematic view illustrating an electrode assembly according to an exemplary embodiment of the present invention.

FIG. 1 is a schematic view illustrating an electrode assembly according to an exemplary embodiment of the present invention.

Referring to FIG. 1, the electrode assembly according to an exemplary embodiment of the present invention includes a cathode plate 110, an anode plate 120, and a separator 130 disposed therebetween. The separator 130 serves to electrically insulate the cathode plate 110 and the anode plate 120. The cathode plate 110 includes a cathode current collector 111, and a cathode active material layer 113 disposed between the cathode current collector 111 and the separator 130. The cathode plate 110 further includes a positive temperature coefficient (PTC) layer 112 disposed between the cathode current collector 111 and the cathode active material layer 113. The PTC layer 112 refers to a layer having a positive temperature coefficient.

The cathode current collector 111 may be generally formed with a thickness of 3 to 500 micrometers. However, the cathode current collector 111 is not particularly limited, as long as it has high conductivity without causing a chemical change in a battery including an electrode assembly according to the exemplary embodiment. For example, stainless steel, aluminum, nickel, titanium, sintered carbon, aluminum or stainless steel surface-treated with carbon, nickel, titanium, silver or the like may be used as the cathode current collector 111. The cathode current collector 111 may be provided with fine ruggedness formed on the surface thereof to thereby increase a bonding force of the cathode active material, and may have various forms such as a film, a sheet, a foil, a net, a porous body, a foam, a non-woven body.

The cathode active material layer 113 may include a cathode active material, the cathode active material may include, but is not limited thereto, a layered compound such as lithium cobalt oxide ($LiCoO_2$), lithium nickel oxide ($LiNiO_2$) or the like, or a compound substituted with one or more transition metals, lithium manganese oxide such as formula $Li_{1+y}Mn_{2-y}O_4$ (where y=0 to 0.33), $LiMnO_3$, $LiMn_2O_3$, $LiMnO_2$ or the like, lithium copper oxide ($Li_2CuO_2$), vanadium oxide such as $LiV_3O_8$, $LiFe_3O_4$, $V_2O_5$, $Cu_3V_3O_7$ or the like, Ni site-type lithium nickel oxide represented by formula $LiNi_{1-y}My O_2$ (where M=Co, Mn, Al, Cu, Fe, Mg, B or Ga, and y=0.01 to 0.3), lithium manganese complex oxide represented by formula $LiMn_{2-y}M_yO_2$ (where M=Co, Ni, Fe, Cr, Zn or Ta, and y=0.01 to 0.1) or $Li_2Mn_3MO_8$ (where M=Fe, Co, Ni, Fe, Cr, or Zn), $LiMn_2O_4$ in which a part of Li in formula is substituted with an alkaline earth metal ion, a disulfide compound, $Fe_2(MnO_4)_3$ or the like.

The cathode active material layer 113 may be prepared by applying a cathode material containing a mixture of the cathode active material, a conductive material, and a binder onto the remaining portions of the cathode current collector 111 except the portion where tabs are to be formed, followed by drying and pressing. A filler may be further added to the mixture, if necessary.

The conductive material typically may be added in an amount of 1 to 50 wt % based on the total weight of the mixture containing the cathode active material. The conductive material is not particularly limited, as long as it has conductivity without causing a chemical change in the battery. As the conductive material, for example, graphite such as natural graphite or artificial graphite or the like; carbon black such as carbon black, acetylene black, ketjen black, channel black, furnace black, lamp black, summer black or the like; conductive fiber such as carbon fiber or metal fiber or the like; metal powders such as carbon fluoride, aluminum, and nickel powders or the like; conductive whisker such as zinc oxide and potassium titanate or the like; conductive metal oxides such as titanium oxide or the like; conductive material such as polyphenylene derivatives or the like may be used.

The binder is a component that assists bonding of the active material and conductive material and bonding to the current collector, and typically may be added in an amount of 1 to 50 wt % based on the total weight of the mixture containing the cathode active material. Examples of this binder may include polyvinylidene fluoride, polyvinyl alcohol, carboxymethyl cellulose, starch, hydroxypropyl cellulose, regenerated cellulose, polyvinyl pyrrolidone, tetrafluoroethylene, polyethylene, polypropylene, ethylene-propylene-diene terpolymer, sulfonated ethyl-propylene-diene terpolymer, styrene butadiene rubber, fluorine rubber, and various copolymers.

The filler may be selectively used as a component for suppressing the expansion of the cathode, and is not particularly limited, as long as it is a fibrous material without causing a chemical change in a battery using an electrode assembly according to the exemplary embodiment. As the filler, for example, olefin-based polymers such as polyethylene, polypropylene or the like, fibrous materials such as glass fibers, carbon fibers or the like may be used.

The anode plate 120 includes an anode current collector 121, and an anode active material layer 123 disposed between the anode current collector 121 and the separator 130. The anode plate 120 may further include the PTC layer 122 disposed between the anode current collector 121 and the anode active material layer 123. The PTC layer 122 has the same properties as the PTC layer 112 described in the cathode plate 110, and may be formed on any one or both of the cathode plate 110 and the anode plate 120.

The anode current collector 121 may be generally formed with a thickness of 3 to 500 micrometers. The anode current collector 121 is not particularly limited, as long as it has high conductivity without causing a chemical change in a battery including an electrode assembly according to an exemplary embodiment. As the anode current collector 121, for example, copper, stainless steel, aluminum-cadmium alloy or the like may be used. In addition, similar to the cathode current collector 111, the anode current collector 121 may be provided with fine ruggedness formed on the surface thereof to thereby increase a bonding force of the anode active material, and may have various forms such as a film, a sheet, a foil, a net, a porous body, a foam, a non-woven body.

The anode active material layer 123 may include an anode active material, and as the anode active material, for example, carbon such as hard carbon, graphite-based carbon, metal complex oxides such as $Li_xFeO_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, Group 2 and Group 3 elements of the Periodic Table, halogen; $0 \leq x \leq 1$; $1 \leq y \leq 3$; $1 \leq z \leq 8$), metal oxides such as lithium metal, lithium alloy, silicon-based alloy, tin-based alloy, SnO, $SnO_2$, PbO, $PbO_2$, $Pb_2O_3$, $Sb_2O_4$, $Sb_2O_5$, GeO, $GeO_2$, $Bi_2O_3$, $Bi_2O_4$ or $Bi_2O_5$, a conductive polymer such as polyacetylene, Li—Co—Ni-based material may be used.

The anode active material layer 123 may be prepared by applying anode material containing a mixture of the anode active material, a conductive material, and a binder onto the remaining portions of the anode current collector 121 except the portion where tabs are to be formed, followed by drying and pressing. The mixture may further include a filler, if necessary.

As the separator 130, an insulating thin film having high ion permeability and mechanical strength may be used. For example, as the separator 130, an olefin-based polymer such as polypropylene having chemical resistance and hydrophobic property, a sheet or non-woven fabric made of glass fiber or polyethylene, and the like may be used.

Coating layers 135 and 137 are respectively disposed above and below the separator 130 according to the present exemplary embodiment. The coating layers 135 and 137 are for improving a thermal stability of the separator 130, and may be formed of an organic/inorganic complex layer. The coating layers 135 and 137 may include a ceramic material. Specifically, the separator 130 according to the exemplary embodiment includes a first portion A that is covered with the coating layers 135 and 137, and a second portion B that exposes a surface of the separator 130 facing the cathode plate 110 and a surface of the separator 130 facing the anode plate 120. In other words, the second portion B refers to a portion of the separator 130 not covered with the coating layers 135 and 137. Herein, the direction parallel to the upper surface of the separator 130 is referred to as a first direction as shown in FIG. 1, and the direction perpendicular to the upper surface of the separator 130 may be referred to as a second direction as shown in FIG. 1. The second portion B of the separator 130 may overlap the cathode active material layer 113 and the anode active material layer 123 in the direction perpendicular to the upper surface of the separator 130. In this case, the portion of the cathode current collector 111 and portion of the anode current collector 121 which overlap the entire region occupied by the second portion B of the separator 130 in the direction perpendicular to the upper surface of the separator 130 may be covered with the cathode active material layer 113 and the anode active material layer 123, respectively.

The first portion A of the separator 130 may occupy most of the area of the separator 130, and the second portion B of the separator 130 may occupy an edge of the separator 130. In FIG. 1, although it is shown that an uncoated portion corresponding to the second portion B is formed at only one end of the separator 130, an uncoated portion such as the second portion B may be additionally formed at another end of the separator 130. Positions and shapes of the uncoated portions may be variously modified. However, when the portions occupied by the uncoated portions are too wide relative to the entire area of the separator 130, it may have an adverse effect on durability in a situation where the battery operates normally. Therefore, an area of the second portion B corresponding to the uncoated portion is preferably equal to or greater than 5% and equal to or less than 15% of a total area of the separator. When the area of the second portion B is less than 5% of the total area of the separator, the possibility of short-circuiting the cathode plate 110 and the anode plate 120 with each other due to thermal shrinkage of the separator 130 is decreased, and the effect according to an exemplary embodiment of the present invention may be less likely to be implemented. In addition, when the area of the second portion B exceeds 15% of the total area of the separator, durability may be deteriorated.

The electrode assembly according to an exemplary embodiment as described above may be impregnated with an electrolyte to constitute a secondary battery.

Hereinafter, the PTC layers 112 and 122 according to the exemplary embodiment will be described in more detail.

The PTC layers 112 and 122 may include a PTC material of a conductive filler and a polymeric material which serves as an electrical insulator. As the polymer material, any conventional thermoplastic polymer used in the manufacture of the PTC material may be selected and used. Specifically, a thermoplastic polymer is a semi-crystalline material, as it may be easier to obtain PTC characteristics from the semi-crystalline material as compared to an amorphous thermoplastic material. As an example, the semi-crystalline thermoplastic material may have a crystallinity of 5% or more, preferably 10% or more, and more preferably 15% or more. The term "semi-crystalline" means that a behavior of the thermoplastic material has a degree of crystallinity sufficient to exhibit a significant degree of, but not completely, crystalline thermoplastic behavior.

In the exemplary embodiment, the thermoplastic polymer may include a high density polyethylene, a linear low density polyethylene, a low density polyethylene, a medium density polyethylene, a maleic anhydride functionalized polyethylene, a maleic anhydride functionalized elastomer ethylene copolymer, an ethylene-butene copolymer, an ethylene-octene copolymer, an ethylene-acrylate copolymer such as an ethylene-methyl acrylate, an ethylene-ethyl acrylate and an ethylene butyl acrylate copolymer, a polyethylene containing glycidyl methacrylate-modified polyethylene, a polypropylene, a maleic anhydride functionalized polypropylene, a glycidyl methacrylate-modified polypropylene, a polyvinyl chloride, a polyvinyl acetate, a polyvinyl acetyl, an acrylic resin, and a syndiotactic polystyrene. The thermoplastic polymer may include, but is not limited thereto, a polyamide, a poly-tetra-fluoroethylene, a polybutylene-terephthalate, a polyphenylene-sulfide, a polyamideimide, a polyimide, a polyethylene vinyl acetate, a glycidyl methacrylate-modified polyethylene vinyl acetate, a polyvinyl alcohol, a poly (methyl methacrylate), a polyacrylonitrile, a polybutadiene, a polyethylene-terephthalate, a poly (8-aminocaprylic acid), a poly (vinyl alcohol), a polycaprolactone or a combination of one or more polymers. As an example, as the thermoplastic polymer, a polyethylene such as high density polyethylene may be used, wherein "high density" refers to having a density of greater than 0.94 g/cm$^3$.

The amount of the thermoplastic polymer may be 30 to 90 wt %, preferably 40 to 70 wt %, and more preferably 40 to 60 wt %, based on the total weight of the PTC composition. As the conductive filler, a carbon-based material such as carbon black, carbon fiber, graphite may be used, but is not necessarily limited thereto. As the PTC layers 112 and 112, a ceramic material, for examples, $BaTiO_3$ may be used. In addition, the PTC layers 112 and 122 may be prepared by mixing and synthesizing pure $BaTiO_3$ raw material with $Y_2O_3$ and $Nb_2O_5$ having a valence of +3 and +5, respectively. For temperature transition, Pb and Sr elements may be substituted for Ba.

As the polymer material included in the PTC layers 112 and 122, the thermoplastic materials described above may be commonly used, but the use of a thermosetting resin is not completely excluded.

The PTC layers 112 and 122 are material layers exhibiting PTC characteristics that they are changed from a conductor to a non-conductor at a specific temperature. The PTC layers 112 and 122 serve to allow the active material to exhibit a constant conductivity regardless of charging and discharging when the battery is normally operated, but are changed to a non-conductor to hinder the battery from properly operating when an internal temperature of the battery is increased due to a short-circuit or an accident.

An effective operating temperature of the PTC layer is preferably 80° C. to 140° C. The "effective operating temperature of the PTC layer" refers to a temperature at which the PTC layer exhibits the PTC characteristics, i.e., a temperature capable of functioning as a fuse that blocks a current due to a rapid increase in resistance caused by the generation of joule heat when an excessive current is generated. Generally, a discharging temperature of the lithium secondary battery is −20 to 60° C., and a charging temperature thereof is 0 to 45° C. However, an internal temperature of the battery may rapidly rise to 100° C. or more due to overcharging, an internal short-circuit or the like. In this case, it is preferable that the PTC layer is operated. However, when the temperature at which the PTC characteristics are expressed exceeds 140° C., the PTC characteristics are not activated until the internal temperature of the battery rises excessively, which is not preferable in terms of stability of the battery. Particularly, an event such as a battery explosion due to thermal runaway caused by self-heating before the PTC characteristics are fully expressed may occur.

According to an exemplary embodiment of the present invention, as described above, an uncoated portion that is covered with no coating layer may be implemented at the edge portion of the separator in order to prevent thermal runaway from occurring before the PTC characteristics are fully expressed. As described above, a process of safely terminating the state of overcharging or the like by simultaneously implementing the PTC layer and the uncoated portion will be described later.

Figure 2:
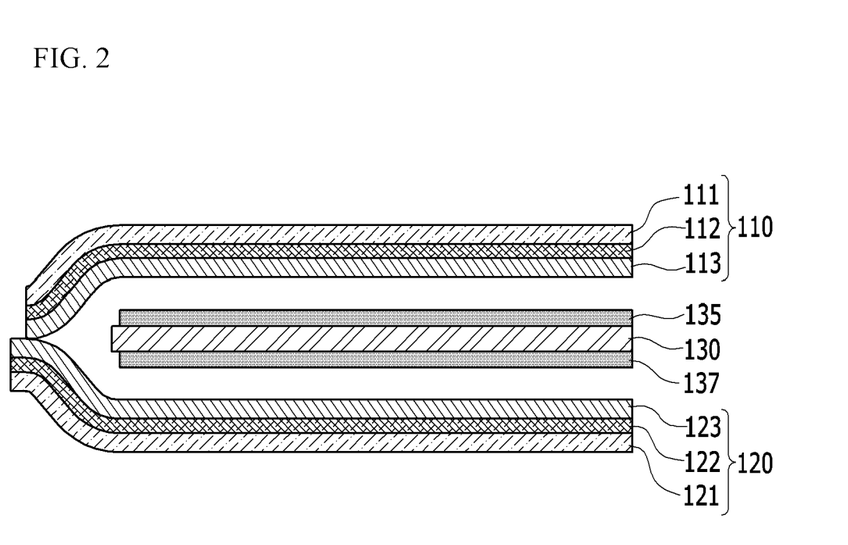
FIG. 2 is a view illustrating an electrode assembly of FIG. 1, in which a cathode plate and an anode plate are short-circuited with each other under an overcharging condition.

FIG. 2 is a view illustrating that in the electrode assembly of FIG. 1, a cathode plate and an anode plate are short-circuited with each other under an overcharging condition.

First, when the battery is overcharged, a voltage and a temperature in the battery may increase simultaneously. In this case, thermal shrinkage occurs in the uncoated portion corresponding to the second portion B of the separator 130 described in FIG. 1. Due to the thermal shrinkage, the cathode plate 110 and the anode plate 120 oppose each other, and the cathode plate 110 and the anode plate 120 contact each other, resulting in a short-circuit. The cathode active material layer 113 and the anode active material layer 123 may be in direct contact with each other. In the exemplary embodiment, the cathode active material layer 113 and the anode active material layer 123 are in direct contact with each other, thereby making it possible to reduce the possibility of occurrence of an event such as an explosion or a fire due to a short-circuit between the current collectors 111 and 121 during a manufacturing process or an operation of the battery.

When the cathode plate 110 and the anode electrode plate 120 contact each other to be short-circuited with each other, a voltage of the secondary battery that has been increased due to overcharging decreases. As described above, the voltage of the battery decreases, and a stable state of charge is maintained for a predetermined time. Thereafter, the temperature increases again due to continuous charging, and the polymer material are expanded and melted in the PTC layers 112 and 122 included in the cathode plate 110 and the anode plate 120, such that a resistance of the battery cell is increased. Specifically, in the polymer material and the conductive filler contained in the PTC layers 112 and 122, spaces between the conductive filler particles present in the polymer material are increased due to a rapid thermal expansion near a melting temperature, to disturb a flow of electrons. Therefore, a battery resistance is rapidly increased, and the current is blocked.

Under the overcharging condition, the PTC layers 112 and 122 included in the electrode assembly according to the exemplary embodiment primarily allow the PTC characteristics to be sufficiently exhibited by obtaining a stable state of charge due to short-circuiting of the cathode plate 110 and the anode plate 120 caused by thermal shrinkage of the uncoated portion of the separator.

Figure 3:
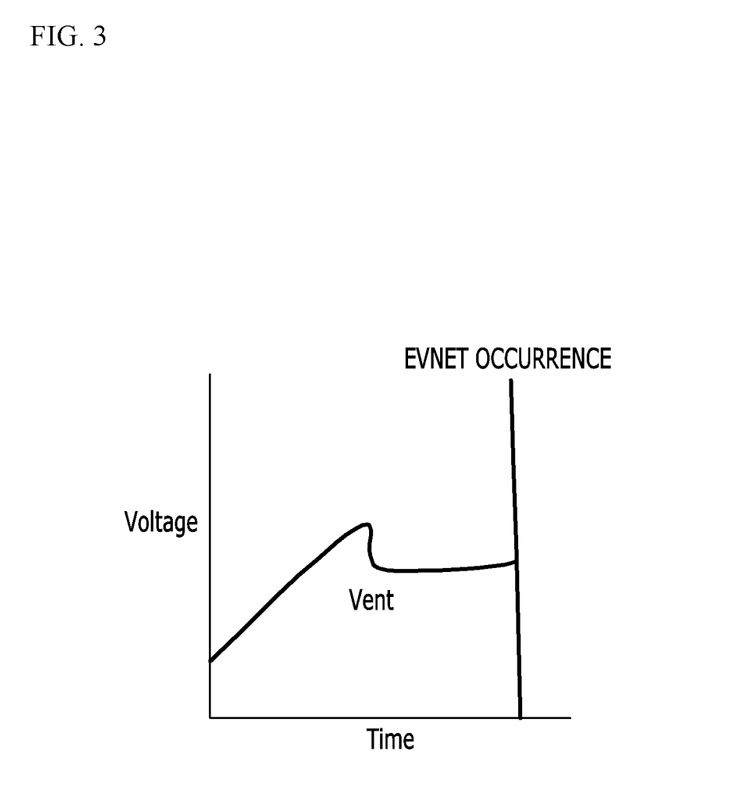
FIG. 3 is a graph illustrating a change in a voltage over time when an electrode assembly according to a Comparative Example to which a PTC material is applied without an uncoated portion is overcharged.

FIG. 3 is a graph illustrating a change in a voltage over time when an electrode assembly according to a Comparative Example to which a PTC material is applied without an uncoated portion is overcharged.

The Comparative Example of FIG. 3 shows a result of an overcharging test using an electrode assembly of which most of the configurations are the same as those of the embodiments described in FIGS. 1 and 2, but in which an uncoated portion corresponding to the second portion B of the separator 130 described in FIGS. 1 and 2 is not present. In other words, an edge of the separator 130 is covered with coating layers 135 and 137. During the overcharging test, the electrode assembly is charged until a battery voltage reaches a termination voltage, which is 1.5 to 2 times the maximum value of a driving voltage of the cell. When no event such as explosion or ignition occurs during the charging or after completion of the charging, it can be interpreted that the electrode assembly has passed the overcharging test.

Referring to FIG. 3, when an electrode assembly is overcharged to or more than a specific state of charge, thermal runaway occurs due to self-heating, resulting in events such as an explosion or a fire. Specifically, in FIG. 3, a portion indicated as "Vent" means that an internal gas mixture is released to the outside due to a significant increase of an internal pressure of the cell caused by an abnormal environment. When a "Vent" phenomenon occurs, the voltage may temporarily decrease due to a pre-symptom of an event such as explosion. Then, thermal runaway occurs before the voltage reaches the termination voltage.

Figure 4:
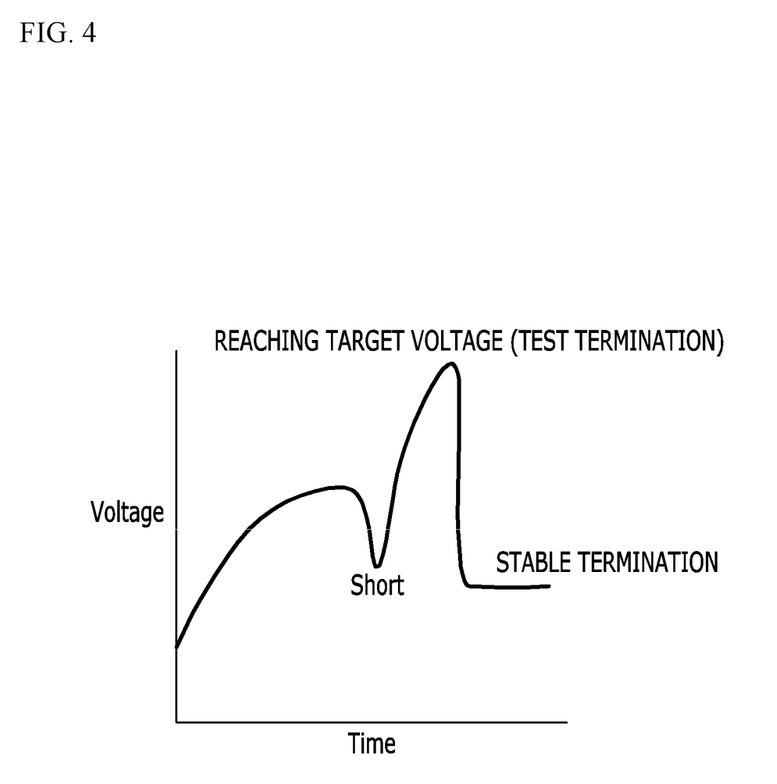
FIG. 4 is a graph illustrating a change in a voltage over time when an electrode assembly according to an exemplary embodiment of the present invention is overcharged.

FIG. 4 is a graph illustrating a change in a voltage over time when an electrode assembly according to an exemplary embodiment of the present invention is overcharged.

Referring to FIG. 4, the cathode and the cathode plates are short-circuited due to the shrinkage of the separator in the uncoated portion, and the battery voltage drops, and a voltage overshoot occurs as the PTC characteristic is expressed in a stable state of charge. The overcharging test may be terminated after the battery voltage reaches a target voltage, which is a maximum value of the battery voltage that may appear in a test process due to the voltage overshoot, and the battery voltage decreases to a stable range as the charging is terminated. In the case of the exemplary embodiment, the state of overcharge may be safely terminated without explosion or a fire unlike the Comparative Example of FIG. 3.

Figure 5:
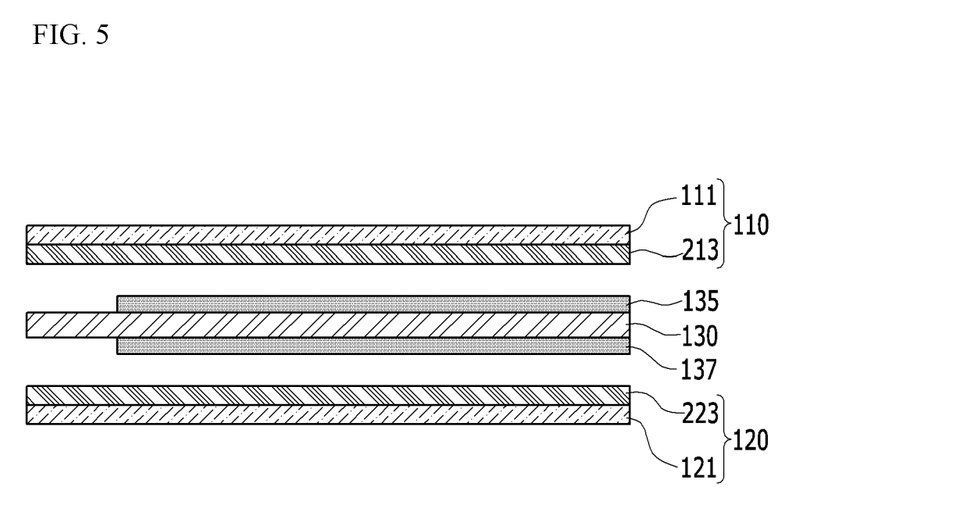
FIG. 5 is a view illustrating a modified embodiment of the electrode assembly described in FIG. 1.

FIG. 5 is a view illustrating a modified embodiment of the electrode assembly described in FIG. 1.

The modified embodiment of FIG. 5 includes mostly same configuration as the embodiment described in FIG. 1. However, in an embodiment of FIG. 5, the PTC layers 112 and 122 described in FIG. 1 are not formed separately from the active material layers 113 and 123 in the cathode plate 110 and the anode plate 120, and the PTC material is mixed within the active material layers 113 and 123. Referring to FIG. 5, a cathode active material layer 213 in which the PTC material is mixed is disposed between the separator 130 and the cathode current collector 111, and an anode active material layer 223 in which the PTC material is mixed is disposed between the separator 130 and the anode current collector 121. In other words, the PTC material is mixed in the cathode active material layer 213 and the anode active material layer 223 of the cathode plate 110 and the anode plate 120, respectively.

In the exemplary embodiment, as described in FIG. 2 and FIG. 4, the PTC characteristic may be expressed under a stable state of charge, and the overcharging condition may be terminated without an event such as explosion or fire.

Although this invention has been described in connection with what is presently considered to be preferred exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

110: cathode plate
120: anode plate
111: cathode current collector
112, 122: PTC layers
113: cathode active material layer
121: anode current collector
123: anode active material layer
130: separator
135, 137: coating layers

The invention claimed is:

1. An electrode assembly, comprising:
   a cathode plate and an anode plate, the cathode plate including a cathode current collector and a cathode active material layer, and the anode plate including an anode current collector and an anode active material layer;
   a separator disposed between the cathode plate and the anode plate; and
   coating layers disposed between the separator and the cathode plate and between the separator and the anode plate,
   wherein the separator includes a first portion that is covered with the coating layer, and a second portion that exposes a surface facing the cathode plate and a surface facing the anode plate, the second portion of the separator overlapping the cathode active material layer and the anode active material layer in a direction perpendicular to an upper surface of the separator, and
   wherein at least one of the cathode plate and the anode plate includes a positive temperature coefficient (PTC) material.

2. The electrode assembly of claim 1, wherein a portion of the cathode current collector and a portion of the anode current collector which overlap an entire region occupied by the second portion of the separator in the direction perpendicular to the upper surface of the separator are covered with the cathode active material layer and the anode active material layer, respectively.

3. The electrode assembly of claim 1, wherein the second portion of the separator is disposed at an edge of the separator.

4. The electrode assembly of claim 1, wherein the coating layer is an organic-inorganic composite layer.

5. The electrode assembly of claim 1, wherein the separator includes an olefin-based polymer.

6. The electrode assembly of claim 1, wherein an area of the second portion is equal to or greater than 5% and equal to or less than 15% of a total area of the separator.

7. A method of stabilizing a secondary battery, comprising:

allowing a voltage and a temperature of the secondary battery to increase due to overcharging of an electrode assembly, wherein the electrode assembly includes a cathode plate, an anode plate, a separator electrically insulating the cathode plate and the anode plate from each other, and coating layers disposed between the separator and the cathode plate and between the separator and the anode plate, the cathode plate including a cathode current collector and a cathode active material layer, and the anode plate including an anode current collector and an anode active material layer;

allowing the cathode plate and the anode plate to be short-circuited with each other due to a thermal shrinking of a second portion of the separator, wherein the separator includes a first portion that is covered with the coating layer and the second portion that exposes a surface facing the cathode plate and a surface facing the anode plate, the short-circuiting of the cathode plate and the anode plate with each other including bringing the cathode active material layer and the anode active material layer into contact with each other;

allowing the voltage of the secondary battery to decrease due to the short-circuit between the cathode plate and the anode plate;

allowing the temperature of the secondary battery to increase by maintaining a state of charge after the decrease of the voltage of the secondary battery due to the short-circuit; and allowing a resistance to increase by a positive temperature coefficient (PTC) material included in at least one of the cathode plate and the anode plate.

8. The method of stabilizing a secondary battery of claim 7, wherein the increase of the resistance by the PTC material occurs due to the increase of the temperature by maintaining the state of charge.

9. The method of stabilizing a secondary battery of claim 7, wherein in the allowing the resistance to increase, the voltage of the secondary battery reaches a maximum value.

\* \* \* \* \*